(12) United States Patent
Okamoto et al.

(10) Patent No.: US 8,767,119 B2
(45) Date of Patent: Jul. 1, 2014

(54) INTERCHANGEABLE LENS, CAMERA BODY, AND CAMERA SYSTEM

(75) Inventors: Mitsuyoshi Okamoto, Osaka (JP); Koji Shibuno, Osaka (JP); Akihiro Okamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 354 days.

(21) Appl. No.: 12/721,657

(22) Filed: Mar. 11, 2010

(65) Prior Publication Data
US 2010/0231782 A1 Sep. 16, 2010

Related U.S. Application Data

(60) Provisional application No. 61/160,010, filed on Mar. 13, 2009.

(30) Foreign Application Priority Data

Apr. 23, 2009 (JP) ................................ 2009-104963

(51) Int. Cl.
*H04N 5/225* (2006.01)

(52) U.S. Cl.
USPC .......................... 348/360; 348/345; 348/354

(58) Field of Classification Search
USPC ........ 348/345–357, 360; 396/79–83, 89–152; 382/255
See application file for complete search history.

(56) References Cited

U.S. PATENT DOCUMENTS

| | | | |
|---|---|---|---|
| 4,935,765 A * | 6/1990 | Ishida et al. | ..................... 396/90 |
| 5,128,769 A | 7/1992 | Arai et al. | |
| 5,161,026 A | 11/1992 | Mabuchi et al. | |
| 6,683,652 B1 | 1/2004 | Ohkawara et al. | |
| 2007/0104474 A1 | 5/2007 | Tamura | |
| 2008/0030593 A1 | 2/2008 | Sato | |
| 2008/0100730 A1 | 5/2008 | Tsuda | |
| 2008/0165274 A1 | 7/2008 | Taguchi | |
| 2008/0198479 A1 | 8/2008 | Saito | |
| 2008/0199170 A1 | 8/2008 | Shibuno et al. | |
| 2008/0199176 A1 | 8/2008 | Kurosawa | |
| 2009/0067828 A1 * | 3/2009 | Ono et al. | ..................... 396/128 |
| 2009/0110383 A1 | 4/2009 | Fujii | |
| 2009/0190910 A1 | 7/2009 | Yasuda et al. | |
| 2009/0268038 A1 | 10/2009 | Matsumoto | |
| 2009/0284612 A1 | 11/2009 | Abe et al. | |
| 2011/0063472 A1 * | 3/2011 | Kitahira et al. | ............. 348/222.1 |
| 2011/0157414 A1 | 6/2011 | Onozawa | |
| 2012/0082444 A1 * | 4/2012 | Yumiki et al. | ................ 396/125 |
| 2012/0127358 A1 | 5/2012 | Furukawa | |

FOREIGN PATENT DOCUMENTS

| | | |
|---|---|---|
| EP | 0 424 678 | 5/1991 |
| JP | 4-069627 | 3/1992 |
| JP | 4-280239 | 10/1992 |
| JP | 2008-242442 | 10/2008 |
| JP | 2008-276131 | 11/2008 |

* cited by examiner

*Primary Examiner* — Paul Berardesca
(74) *Attorney, Agent, or Firm* — Panasonic Patent Center

(57) ABSTRACT

An interchangeable lens mountable to a camera body, includes a focus lens operable to adjust a focus state of a subject, a driver operable to drive the focus lens by repeatedly performing slight advancing and retreating of the focus lens along an optical axis, a lens-side obtaining unit operable to obtain a control signal for driving the driver from the camera body, and a lens-side transmission unit operable to transmit, to the camera body, information about a direction of slight advancing and retreating operations of the focus lens.

12 Claims, 6 Drawing Sheets

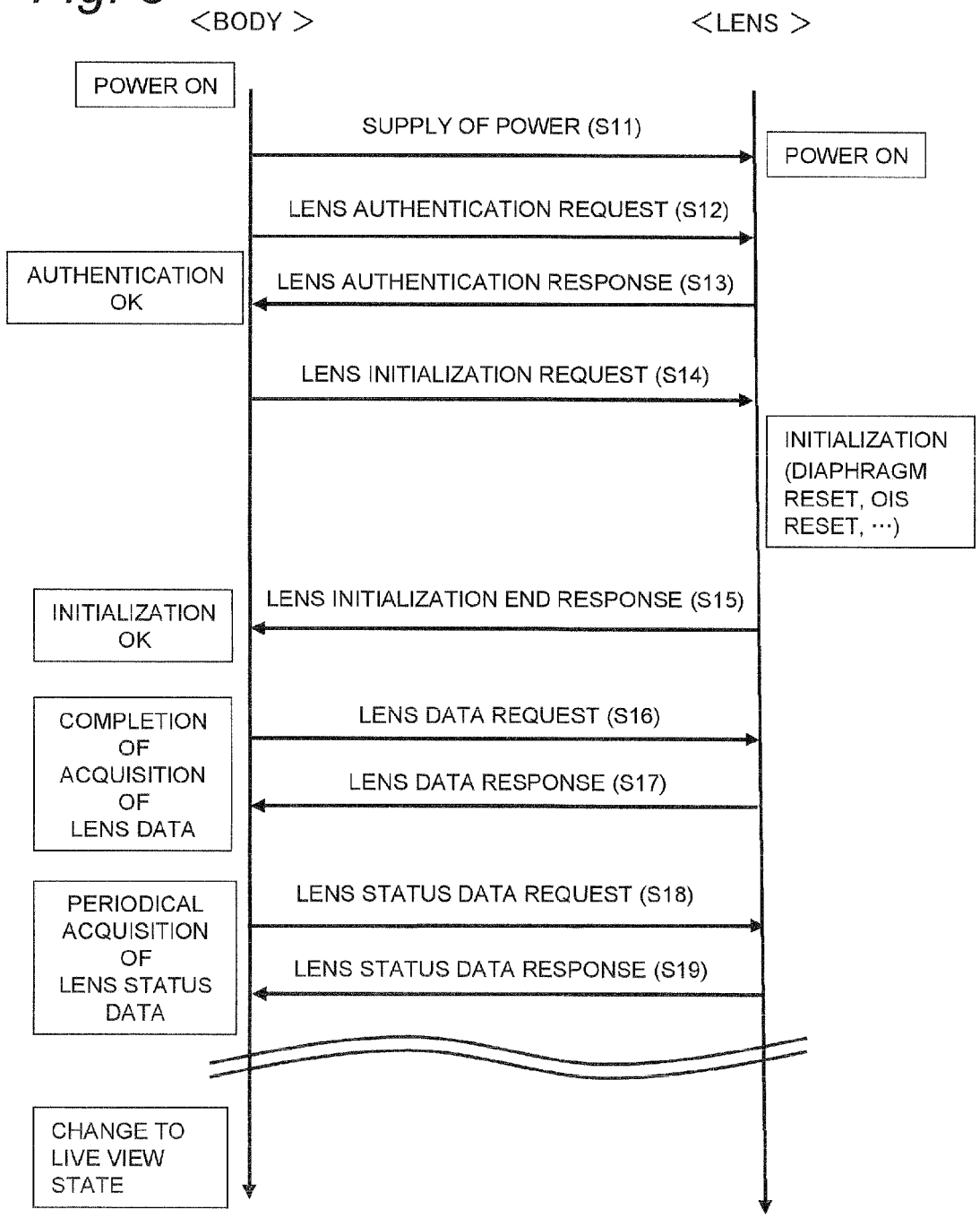

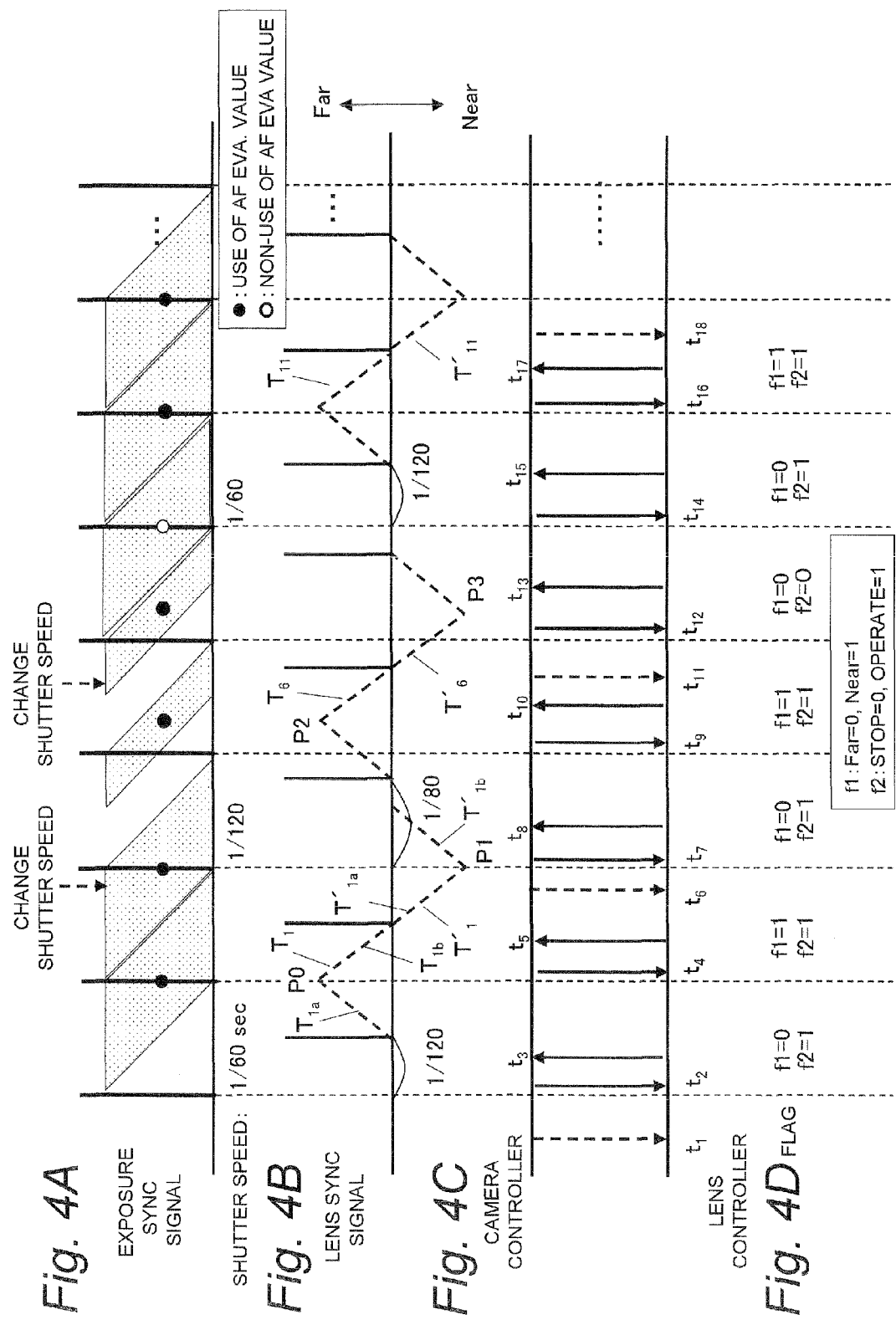

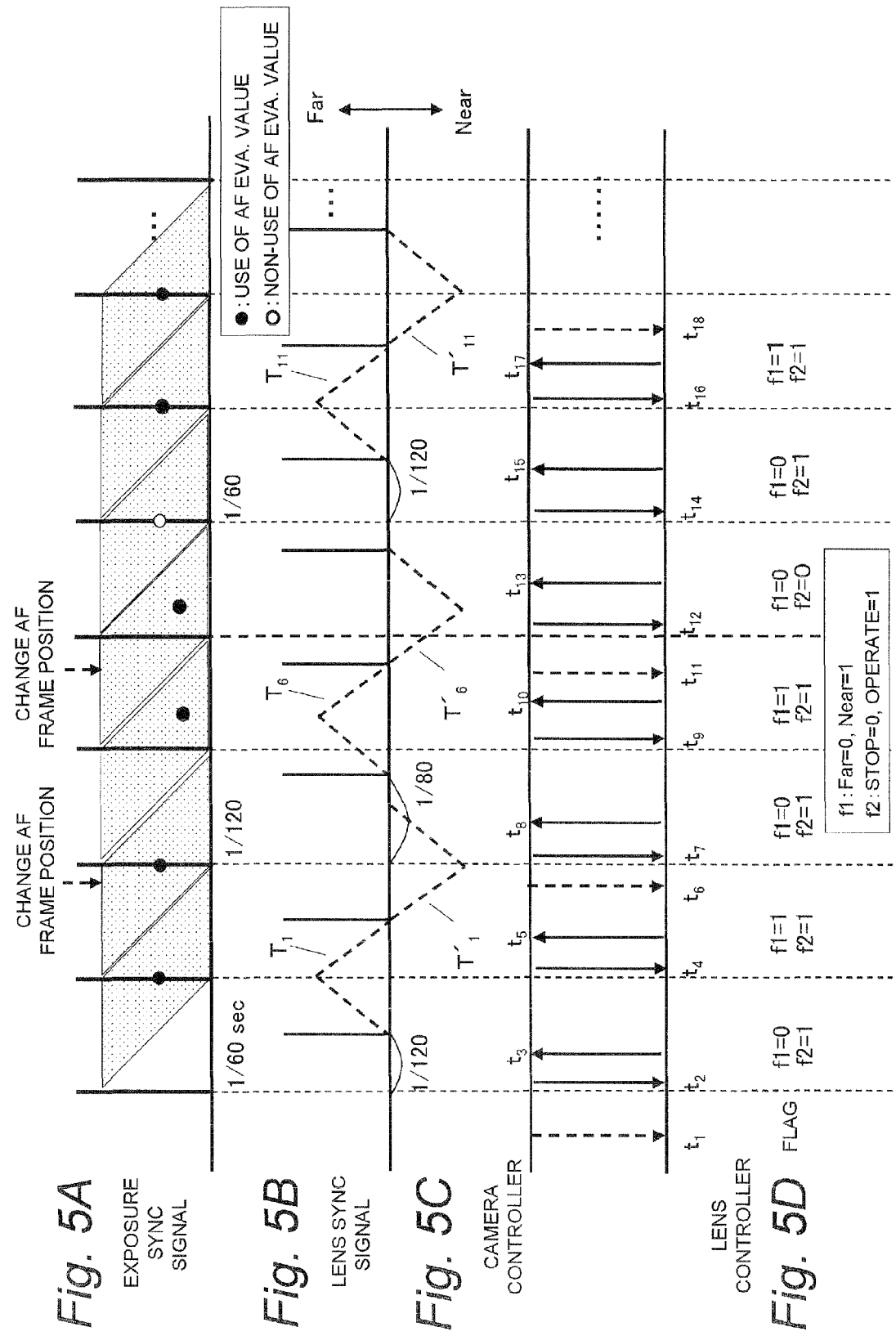

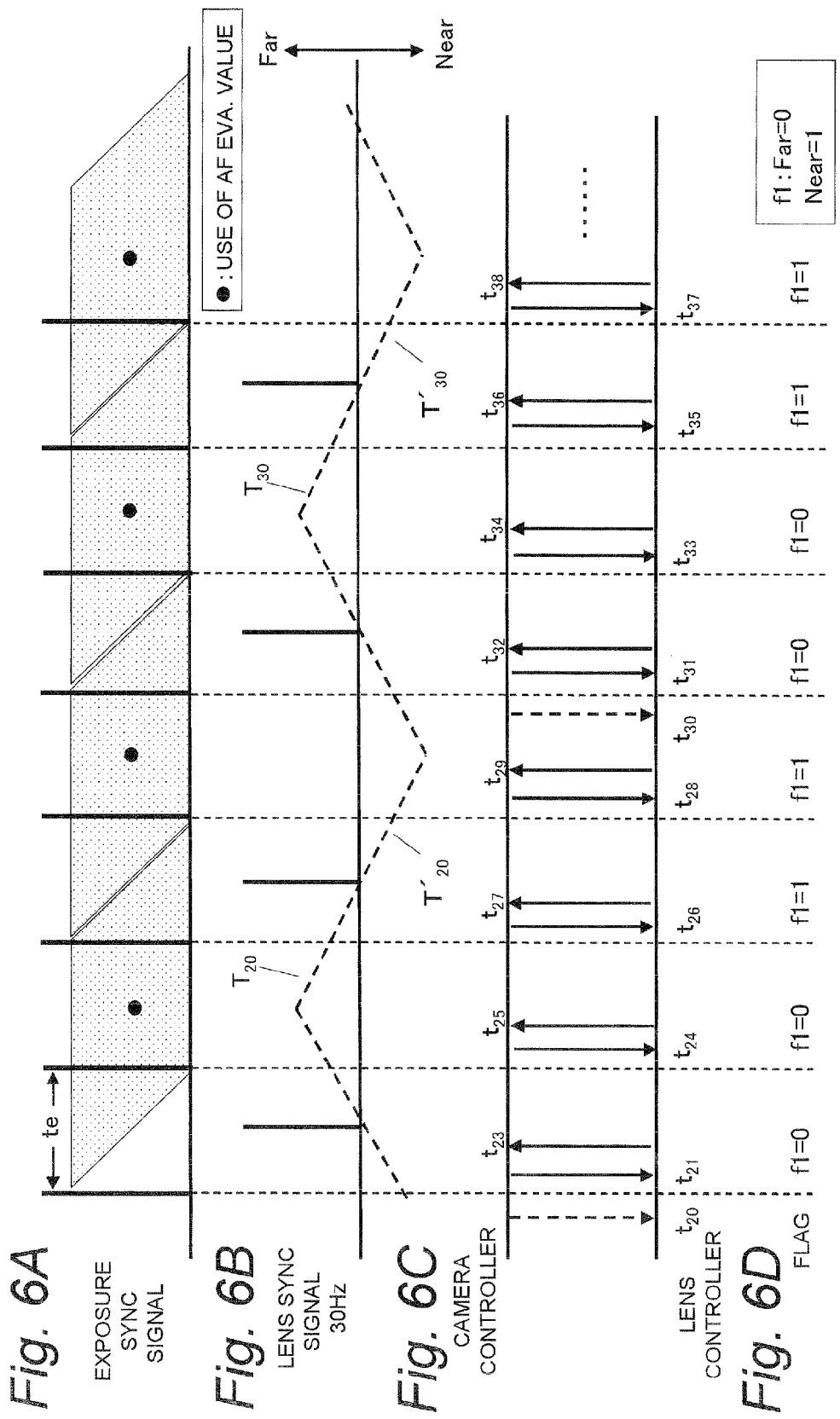

INTERCHANGEABLE LENS, CAMERA BODY, AND CAMERA SYSTEM

BACKGROUND

1. Technical Field

The present invention relates to a camera system, and particularly relates to a camera system capable of supporting autofocus control in recording of moving images, an interchangeable lens and a camera body constituting the camera system.

2. Related Art

JP4-280239A discloses an interchangeable lens type camera apparatus. A lens unit that is mounted to a camera body of this camera apparatus has a drive system that regulates automatic focus and controls automatic exposure. The lens unit has status information about the lens unit. This camera apparatus controls the lens unit from the camera body by communicating various control information and the status information between the camera body and the lens unit.

The camera apparatus disclosed in JP4-280239A, when recording moving images, may not accurately know a drive condition of a focus lens in some cases. For this reason, when autofocus is controlled, false control is occasionally made.

SUMMARY

To solve the aforementioned problems, a camera system that can accurately control autofocus at the time of recording moving images, an interchangeable lens and a camera body constituting the camera system are provided.

In accordance with a first aspect, an interchangeable lens mountable to a camera body is provided, which includes a focus lens operable to adjust a focus state of a subject, a driver operable to drive the focus lens by repeatedly performing slight advancing and retreating of the focus lens along an optical axis, a lens-side obtaining unit operable to obtain a control signal for driving the driver from the camera body, and a lens-side transmission unit operable to transmit, to the camera body, information about a direction of slightly advancing and retreating the focus lens.

In accordance with a second aspect, a camera body to which the interchangeable lens according to the first aspect is mountable is provided, which includes a camera-side obtaining unit operable to obtain the information about the direction from the interchangeable lens, a controller operable to generate the control signal according to the information about the direction obtained by the camera-side obtaining unit, and a camera-side transmission unit operable to transmit the control signal to the interchangeable lens.

In accordance with a third aspect, an interchangeable lens mountable to a camera body is provided, which includes a focus lens operable to adjust a focus state of a subject, a driver operable to drive the focus lens by repeatedly performing slight advancing and retreating of the focus lens along an optical axis, a lens-side obtaining unit operable to obtain a control signal for driving the driver from the camera body, and a lens-side transmission unit operable to transmit, to the camera body, information about availability of an operation for indicating whether or not the focus lens can be driven according to the control signal.

In accordance with a fourth aspect, a camera body to which the interchangeable lens according to the third aspect is mountable is provided, which includes a camera-side obtaining unit operable to obtain the information about availability of the operation from the interchangeable lens, a controller operable to generate the control signal according to the obtained information about availability of the operation obtained by the camera-side obtaining unit, and a camera-side transmission unit operable to transmit the control signal to the interchangeable lens.

In accordance with a fifth aspect, an interchangeable lens mountable to a camera body is provided, which includes a focus lens operable to adjust a focus state of a subject, a driver operable to drive the focus lens by repeatedly performing slight advancing and retreating of the focus lens along an optical axis, a lens-side obtaining unit operable to obtain a control signal for driving the driver from the camera body, and a lens-side transmission unit operable to transmit, to the camera body, information about a direction of slightly advancing and retreating the focus lens and information about availability of an operation for indicating whether or not the focus lens can be driven according to the control signal.

In accordance with a sixth aspect, a camera body to which the interchangeable lens according to the fifth aspect is mountable is provided, which includes a camera-side obtaining unit operable to obtain the information about the direction and the information about availability of the operation from the interchangeable lens, a controller operable to generate the control signal according to the information about the direction and information about availability of the operation obtained from the camera-side obtaining unit, and a camera-side transmission unit operable to transmit the control signal to the interchangeable lens.

The camera system can be composed by suitably combining the interchangeable lens and the camera body of the above-described aspect.

According to the above aspects, the autofocus can be accurately controlled at the time of recording moving images in the camera system.

BRIEF DESCRIPTION OF THE DRAWINGS

FIG. 3 is a diagram describing a recording preparation operation of the camera system.

FIGS. 4A, 4B, 4C, and 4D are timing charts describing transmission/reception of signals in the wobbling control at the time of changing a shutter speed.

FIGS. 5A, 5B, 5C, and 5D are timing charts describing the transmission/reception of signals in the wobbling control at the time of changing a focus position.

FIGS. 6A, 6B, 6C, and 6D are timing charts describing the transmission/reception of signals in the wobbling control at doubled cycles.

DETAILED DESCRIPTION OF THE PREFERRED EMBODIMENTS

An embodiment of the present invention is described below with reference to the accompanying drawings.

A camera system according to the embodiment can record moving images, and includes a camera body and an interchangeable lens. The camera system 1 can suitably control autofocus according to an operation state of a focus lens at the time of recording moving images.

1. Configuration of Camera System

Figure 1:
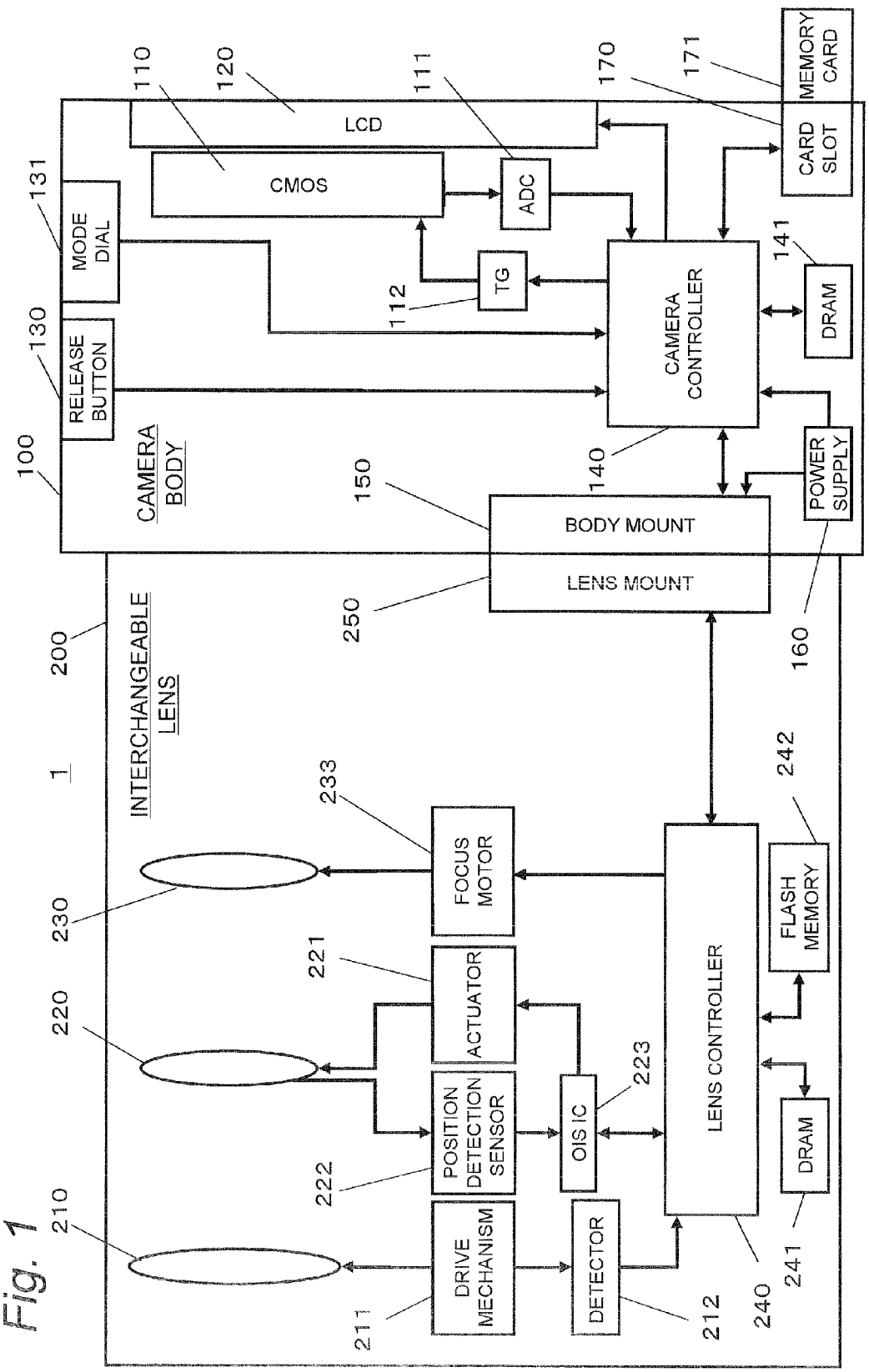
FIG. 1 is a block diagram illustrating a configuration of a camera system.

A configuration of the camera system according to the present embodiment is described with reference to FIG. 1. The camera system 1 includes a camera body 100 and an interchangeable lens 200. Configurations of the camera body 100 and the interchangeable lens 200 are described below, respectively.

1-1. Configuration of Camera Body

The camera body 100 has a CMOS image sensor 110, a liquid crystal display (LCD) monitor 120, a camera controller 140, a body mount 150, a power supply 160, and a card slot 170.

The camera controller 140 controls an entire operation of the camera system 1 according to instructions from an operation member such as a release button 130. The camera controller 140 transmits a vertical synchronizing signal to a timing generator 112. In conjunction with this, the camera controller 140 generates an exposure synchronizing signal based on the vertical synchronizing signal. The camera controller 140 periodically and repeatedly transmits the generated exposure synchronizing signal to a lens controller 240 of the interchangeable lens 200 via the body mount 150 and the lens mount 250. The camera controller 140 uses a DRAM 141 as a work memory at the time of a control operation or an image processing operation.

The CMOS image sensor 110 captures a subject image incident via the interchangeable lens 200 to generate image data. The generated image data is digitized by an AD converter 111. The image data digitized by the AD converter 111 is subject to various images processes in the camera controller 140. The various image processes include, for example, a gamma correction process, a white balance correction process, a flaw correction process, an YC conversion process, an electronic zoom process, and an image compression process such as a JPEG compression process.

The CMOS image sensor 110 operates at timing controlled by a timing generator 112. The operations of the CMOS image sensor 110 includes an operation for recording still images, an operation for recording moving images, and an operation for recording through images. A through image is displayed on the liquid crystal display monitor 120, but is not recorded in a memory card 171. A through image is mainly a moving image, and is displayed on the liquid crystal display monitor 120 in order to determine a composition for recording still images.

The CMOS image sensor 110 can regulate exposure time of a subject. A function for regulating the exposure time in the CMOS image sensor 110 is called an "electronic shutter". The electronic shutter system includes a global shutter system and a rolling shutter system. In the global shutter system, a shutter operation is performed on all pixels of the CMOS image sensor 110 at the same timing. In the rolling shutter system, the shutter operation is performed on each one to a several lines constituting one block in the CMOS image sensor 110. At this time, the shutter operation is performed on one block at the same timing, and then sequentially performed on each block. That is, in the rolling shutter system, slight time lag is generated in the shutter operation among the blocks. In the present embodiment, the electronic shutter of the CMOS image sensor 110 is realized by the rolling shutter system.

The liquid crystal display monitor 120 displays an image indicated by display image data processed by the camera controller 140. The liquid crystal display monitor 120 can selectively display a moving image or a still image.

A memory card 171 can be attached to the card slot 170. The card slot 170 controls the memory card 171 based on control of the camera controller 140. The memory card 171 can store image data generated by the image processes of the camera controller 140. For example, the memory card 171 can store a JPEG image file. The memory card 171 can output image data or an image file stored therein. The image data or the image file outputted from the memory card 171 is processed by the camera controller 140. For example, the camera controller 140 expands the image data or the image file obtained from the memory card 171 to generate display image data.

The power supply 160 supplies power for driving the camera system 1. The power supply 160 may be, for example, a dry battery or a rechargeable battery. Power supplied externally via a power cord may be supplied to the camera system 1.

A mode dial 131 is for changing a mode of the camera system 1. A user can switch the mode of the camera system 1 into a moving image recording mode or a still image recording mode by operating the mode dial 131.

The body mount 150 can be mechanically and electrically connected to the lens mount 250 of the interchangeable lens 200. The body mount 150 can transmit/receive data to/from the interchangeable lens 200 via the lens mount 250. The body mount 150 transmits the exposure synchronizing signal received from the camera controller 140 to the lens controller 240 via the lens mount 250. The body mount 150 also transmits other control signals received from the camera controller 140 to the lens controller 240 via the lens mount 250. The body mount 150 transmits a signal received from the lens controller 240 via the lens mount 250 to the camera controller 140. Moreover, the body mount 150 supplies the power from the power supply 160 to the entire interchangeable lens 200 via the lens mount 250.

1-2. Configuration of Interchangeable Lens

The interchangeable lens 200 has an optical system, the lens controller 240, and the lens mount 250. The optical system includes a zoom lens 210, an OIS lens 220, and a focus lens 230.

The zoom lens 210 is for changing magnification of a subject image formed by the optical system of the interchangeable lens 200. The zoom lens 210 includes one or a plurality of lenses. A drive mechanism 211 includes a zoom ring or the like operable by the user and transmits a user's operation to the zoom lens 210 so as to move the zoom lens 210 along a direction of an optical axis of the optical system. A detector 212 detects a drive amount of the drive mechanism 211. The lens controller 240 obtains a detected result from the detector 212 so as to be capable of obtaining a zoom magnification of the optical system. The lens controller 240 obtains the detected result from the detector 212 so as to be capable of obtaining a position of the zoom lens 210 in the optical system.

The OIS lens 220 is for correcting blur of a subject image formed by the optical system of the interchangeable lens 200. The OIS lens 220 moves along a direction where blur of the camera system 1 is compensated, so as to reduce the blur of the subject image in the CMOS image sensor 110. The OIS lens 220 includes one or a plurality of lenses. An actuator 221 drives the OIS lens 220 in a plane vertical to the optical axis of the optical system based on control of IC 223 for OIS. The actuator 221 can be realized by, for example, a magnet and a planar coil. A position detection sensor 222 is for detecting a position of the OIS lens 220 in the plane vertical to the optical axis of the optical system. The position detection sensor 222 can be realized by, for example, a magnet and a Hall element. The IC 223 for OIS controls the actuator 221 based on a detected result of the position detection sensor 222 and a detected result of the blur detector such as a gyro sensor.

The focus lens 230 is for changing a focus state of a subject image formed on the CMOS image sensor 110 in the optical system. The focus lens 230 includes one or a plurality of lenses.

A focus motor 233 drives the focus lens 230 so that the focus lens 230 advances/retreats along the optical axis of the optical system based on the control of the lens controller 240. As a result, the focus state of a subject image formed on the CMOS image sensor 110 in the optical system can be changed. The focus motor 233 also drives the focus lens 230 so that the focus lens 230 slightly advances/retreats along the optical axis of the optical system based on the control of the lens controller 240. Consequently, even when moving images are recorded, autofocus can be controlled. A stepping motor can be used as the focus motor 233 in the present embodiment. The focus motor 233 is not, however, limited thereto, and can be realized by a servo motor, an ultrasonic motor or the like.

The lens controller 240 controls an entire operation of the interchangeable lens 200 based on the control signal from the camera controller 140. The lens controller 240 receives signals from the detector 212, the IC 223 for CIS, or the like, and transmits the received signals to the camera controller 140. The lens controller 240 communicates with the camera controller 140 via the lens mount 250 and the body mount 150.

The lens controller 240 receives an instruction of a wobbling operation from the camera controller 140, so as to control the wobbling operation of the focus lens 230. The wobbling control is for slightly advancing/retreating the focus lens 230 along the optical axis so as to continuously control the autofocus at the time of recording moving images. The lens controller 240 transmits, to the camera controller 140, information about a wobbling direction at next exposure timing and information about availability of the wobbling operation (details will be described later). The lens controller 240 uses a DRAM 241 as a work memory at the time of control.

A flash memory 242 stores therein programs and parameters used for the control of the lens controller 240. For example, the flash memory 242 stores therein a control program for controlling the wobbling of the focus lens 230, and a program for realizing the autofocus control (so-called hill climbing autofocus control) at the time of recording still images.

2. Wobbling Control

The wobbling control of the focus lens 230 is described. In the wobbling control, by repeatedly advancing and retreating slightly the focus lens 230 along the optical axis, the focus lens 230 is gradually moved toward a subject (far side) or the CMOS image sensor 100 (near side), so that the focus position is detected. The wobbling control is specifically described with reference to FIG. 2.

Figure 2:
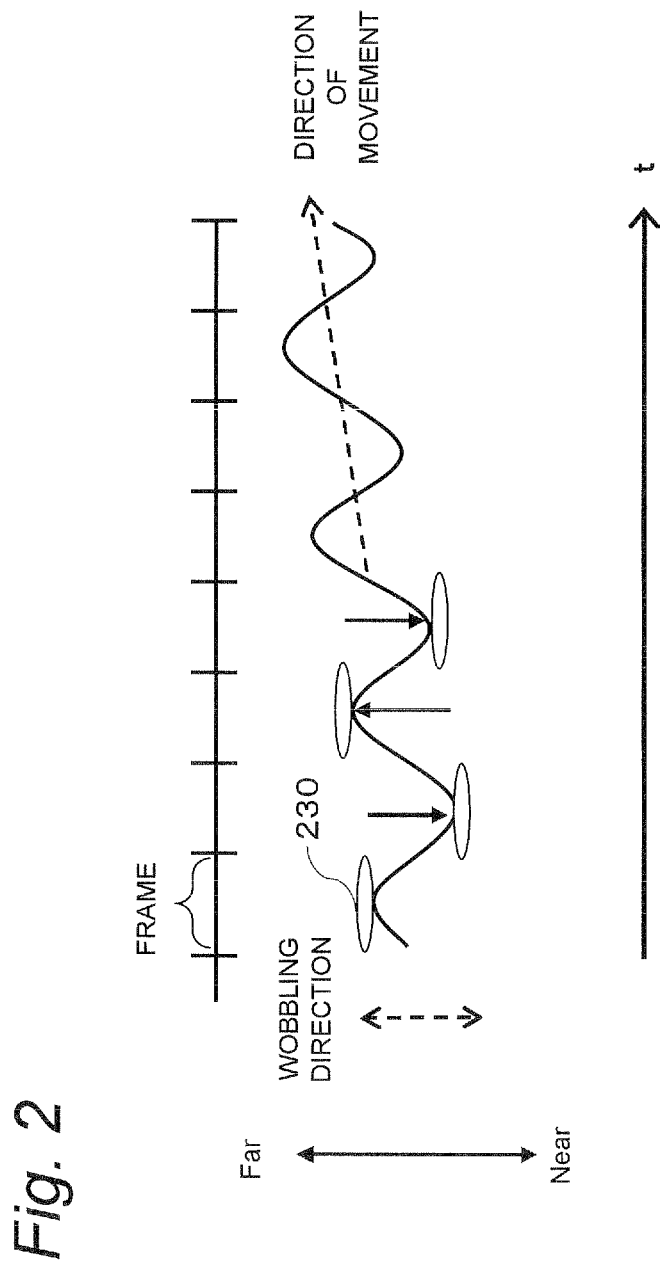
FIG. 2 is a diagram describing wobbling control.

FIG. 2 is a diagram describing a trajectory of the focus lens 230 when the wobbling control is performed with the focus lens 230 being moved to the subject (far side). In FIG. 2, a vertical axis indicates the position of the focus lens 230 on the optical axis, and a horizontal axis indicates a time axis.

As shown in FIG. 2, the focus lens 230 repeatedly advances and retreats slightly along the optical axis to gradually move toward the subject (far side). When the wobbling is controlled, the camera controller 140 advances or retreats the focus lens 230 along the optical axis every time an image for one frame is captured. Every time the image for one frame is captured and image data is generated, the camera controller 140 calculates an evaluation value (hereinafter, referred to as "AF evaluation Value") of the generated image data for an autofocus operation. As the method for obtaining the AF evaluation value, there is known a method in which a brightness signal is obtained from the image data generated by the CMOS image sensor 110 and high-frequency components in the plane of the brightness signal are integrated so as to obtain the AF evaluation value.

Every time image data for two frames is generated, the camera controller 140 calculates the AF evaluation values in the following two states. In one state, the focus lens 230 is moved toward the subject (far side) along the direction of the optical axis, and in the other state, the focus lens 230 is moved toward the CMOS image sensor 110 (near side). By comparing these two AF evaluation values, the camera controller 140 determines the direction of movement of the focus lens 230 at a subsequent cycle. That is, the camera controller 140 determines whether the focus lens 230 is moved toward the subject or the CMOS image sensor 110 at a subsequent cycle based on the two AF evaluation values. The camera controller 140 generates a control signal of the focus lens 230 based on this determination. The camera controller 140 thus advances and retreats the focus lens 230 along the optical axis, so that the subject image is continuously focused at the time of recording moving images.

Every time the control signals indicating the instructions of a moving direction, a moving amount, an amplitude of the focus lens 230 are obtained from the camera controller 140 via the lens mount 250, the lens controller 240 controls the focus motor 233. The advancing/retreating of the focus lens 230 is not performed at a constant speed. The camera controller 140 reduces the moving speed of the focus lens 230 near a place where the direction of movement of the focus lens 230 is changed. As a result, a moving image in which focus condition is approximately equal through the entire recording time can be recorded.

3. Operation

3-1. Recording Preparation Operation

An operation for preparing the recording in the camera system 1 is described. FIG. 3 is a diagram illustrating signal transmission/reception in order describe the recording preparation operation of the camera system 1 according to the present embodiment.

In FIG. 3, when the user turns ON the camera body 100 with the interchangeable lens 200 being mounted to the camera body 100, the power supply 160 supplies power to the interchangeable lens 200 via the body mount 150 and the lens mount 250 (S11). The camera controller 140 requests the lens controller 240 to transmit authentication information about the interchangeable lens 200 (S12). The authentication information about the interchangeable lens 200 includes information about whether or not the interchangeable lens 200 is mounted and information about whether or not an accessory is attached. The lens controller 240 responds to the request of the lens authentication from the camera controller 140 (S13).

The camera controller 140 requests the lens controller 240 to perform an initializing operation (S14). In response to this request, the lens controller 240 performs the initializing operation such as resetting of a diaphragm and resetting of the OIS lens 220. The lens controller 240 then sends back information about completion of the lens initializing operation to the camera controller 140 (S15).

The camera controller 140 requests the lens controller 240 to transmit lens data (S16). The lens data is stored in the flash memory 242. The lens controller 240 then reads the lens data from the flash memory 242, and transmits the lens data back to the camera controller 140 (S17). The lens data is characteristic values specific to the interchangeable lens 200 such as a lens name, an F number and a focal length.

When the camera controller 140 recognizes the lens data about the interchangeable lens 200 mounted to the camera body 100, the camera system 1 shifts to a recordable state. In this state, the camera controller 140 periodically requests the lens controller 240 to transmit lens status data indicating the status of the interchangeable lens 200 (S18). The lens status data includes, for example, zoom magnification information about the zoom lens 210, position information about the focus lens 230, information about a diaphragm value, information about the wobbling direction, and information about availability of the wobbling operation. In response to this request, the lens controller 240 sends back the requested lens status data to the camera controller 140 (S19).

3-2. Information about Wobbling Direction and Information about Availability of Wobbling Operation The information about the wobbling direction and the information about availability of the wobbling operation are described. The information about the wobbling direction is information indicating whether the direction of the slight oscillation of the focus lens 230 is a direction toward the CMOS image sensor 110 (near side) or a direction toward the subject (far side). This information is, for example, flag information such as "0" or "1". The information about the wobbling direction is transmitted from the lens controller 240 to the camera controller 140. In the present embodiment, when the direction of the slight oscillation of the focus lens 230 is a direction toward the far side, the flag information is "0", and when it is a direction toward the near side, the flag information is "1".

The information about availability of the wobbling operation is information indicating whether or not the wobbling operation can be performed on the side of the lens 200 at next exposure timing in response to the wobbling instruction from the camera body 100. The information about availability of the wobbling operation is also the flag information such as "0" or "1", and is transmitted from the lens controller 240 to the camera controller 140. In the present embodiment, when the operation can not be performed at next exposure timing in response to the wobbling instruction, the flag information shows "0", and when the operation can be performed, the flag information shows "1".

In such a manner, the camera system 1 according to the present embodiment transmits the information about the wobbling direction and the information about availability of the wobbling operation as the lens status data from the lens controller 240 to the camera controller 140. This allows the camera body 100 to accurately control the drive of the focus lens 230.

3-3. Control of Wobbling Operation when Recording Moving Images

The control of the wobbling operation at the time of recording moving images is described. The wobbling is performed according to a lens synchronizing signal. The exposure timing of a subject image in the focus position changes according to a change in shutter speed. For this reason, the lens synchronizing signal is generated by the lens controller 240 based on an exposure timing information and an exposure synchronizing signal transmitted from the camera controller 140. Thus, the lens synchronizing signal is generated so that the wobbling timing of an oscillation end matches with the exposure timing on the focus position.

Communication between the camera controller 140 and the lens controller 240 at the time of the wobbling control and association of the AF evaluation values with the wobbling directions are described with reference to FIGS. 4A-4D. As an example, the control of the wobbling operation at the time of changing the shutter speed is described. The focus lens 230 does not move to the direction of the focus position. That is, the focus lens 230 slightly oscillates on the same position in the wobbling operation.

FIGS. 4A-4D are timing charts for describing the transmission/reception of the signals between the camera controller 140 and the lens controller 240 at the time of the wobbling control. In FIGS. 4A-4D, the horizontal axis indicates a temporal axis. Note that FIG. 4A illustrates an exposure state (dot-hatching portion) in a rolling shutter system, superimposed on the exposure synchronizing signal. As to the exposure state in the rolling shutter system, the vertical axis indicates a vertical direction of the screen, and the horizontal axis indicates the exposure time. Further, in FIG. 4A, black circles and a white circle indicate a position of the screen vertical direction where the AF evaluation values are calculated and the exposure timing. FIGS. 4A-4D illustrates an example where the AF evaluations values are calculated near the screen center and near a middle of the exposure time. In FIG. 4B, a changing state of the position of the focus lens 230 in the wobbling control is also shown by a broken line, superimposed on the lens synchronizing signal.

The user operates the mode dial 131, so that the camera system 1 can be set into the moving image recording mode. When the camera system 1 is set into the moving image recording mode, the camera controller 140 stands by until it receives a user's instruction to start the recording of moving images. At this time point, the camera controller 140 synchronizes with the lens controller 240.

When the camera controller 140 receives the instruction to start the recording of moving images from the user and determines that the wobbling of the focus lens 230 should be controlled, the camera controller 140 transmits a wobbling instruction command indicating the wobbling instruction to the lens controller 240 via the body mount 150 (t1). The wobbling instruction command is for instructing a moving amount, a moving direction, amplitude and the like of the focus lens 230 at the time of the wobbling and information on exposure timing changed according to a change in a shutter speed. When the lens controller 240 receives the wobbling instructing command, the lens controller 240 controls the focus motor 233 so that the focus motor 233 drives the focus lens 230 according to the command contents.

After the wobbling instruction command is transmitted to the interchangeable lens 200, the camera controller 140 transmits a request signal to the lens controller 240 at next exposure timing (t2). When receiving the request signal, the lens controller 240 transmits, to the camera body 100, the information about the wobbling direction and the information about availability of the wobbling operation (t3). Since a next wobbling direction is a direction toward the far side at timing t3, the flag information is set to "0" and is transmitted. Since the wobbling operation is available at next exposure timing in response to the wobbling instruction of the timing t1, the flag information indicating "1" is transmitted as the information about availability of the wobbling operation at the timing t3.

At this time, the focus lens 230 performs the wobbling operation to the far side as shown by a broken line T1 according to the wobbling instruction command of the timing t1. In this case, the wobbling operation T1 relating to the movement to the far side includes movement (T1*a*) of the focus lens 230 from a starting position to a far-side oscillation end (end point) and movement (T1*b*) from the far-side oscillation end to the starting position.

On a wobbling oscillation end P0 on the far side, the AF evaluation value of the obtained image data is calculated. The camera controller 140 relates the calculated AF evaluation value to the flag information "0" about the wobbling direction.

Similarly to the above, also at next exposure timing, the camera controller 140 transmits a request signal to the lens controller 240 (t4). When receiving the request signal, the lens controller 240 transmits, to the camera body 100, the information about the wobbling direction and the information about availability of the wobbling operation (t5). Since a next wobbling direction is the near side at timing t5, the flag information "1" indicating the near side is transmitted. Since the wobbling operation is available at next exposure timing, the flag information "1" is transmitted as the information about availability of the wobbling operation at the timing t5.

At this time, the focus lens 230 performs the wobbling operation to the near side as shown by a broken line T'1 according to the wobbling instruction command of the timing t1. In this case, the AF evaluation value of the obtained image data is calculated on the wobbling oscillation end P1 on the near side. The camera controller 140 relates the calculated AF evaluation value to the flag information "1" about the wobbling direction. The wobbling operation T'1 relating to the movement to the near side includes a movement (T'1a) from the starting position to the near side oscillation end (end point) of the focus lens 230 and a movement (T'1b) from the near side oscillation end to the starting position. In the present embodiment, as described above, the operation for moving the focus lens 230 to the far side oscillation end (for example T1), and the operation for moving the focus lens 230 to the near side oscillation end (for example T'1) are performed in response to one wobbling instruction command.

Here, assume that the shutter speed is changed after timing t5. For example, the shutter speed is changed from 1/60 sec to 1/120 sec. The camera controller 140 transmits a new wobbling instruction command to the lens controller 240 according to the change in shutter speed (t6). The exposure timing on the focus position changes according to the change in shutter speed. At this time, the lens synchronizing signal is set so that the timing of the wobbling oscillation end P matches with the exposure timing on the focus position. Note that in this example, although depending on responding performance on the lens side, the wobbling operation can be also performed at the next exposure timing according to the change in shutter speed.

When the next exposure timing comes after the wobbling instruction command of the timing t6 is transmitted to the interchangeable lens 200, the camera controller 140 transmits a request signal to the lens controller 240 (t7). When receiving the request signal, the lens controller 240 transmits, to the camera body 100, the information about the wobbling direction and the information about availability of the wobbling operation (t8). Since the next wobbling direction is a direction to the far side at timing t8, the flag information "0" is transmitted. Since the wobbling operation can be performed at the next exposure timing in response to the wobbling instruction of the timing t6, the flag information "1" is transmitted as the information about availability of the wobbling operation at the timing t8.

Similarly to the timings t4 and t5, the information is exchanged between the lens controller 240 and the camera controller 140 also at timings t9 and t10. At this time, the focus lens 230 performs the wobbling operation as shown by broken lines T6 and T'6 according to the wobbling instruction command of timing t6. Further, the camera controller 140 relates the AF evaluation values on the wobbling oscillation ends P2 and P3 to the flag information about the wobbling directions, respectively.

After timing t10, it is assumed that the shutter speed is changed from 1/120 sec to 1/60 sec, for example. The camera controller 140 transmits a new wobbling instruction command to the lens controller 240 according to the change in shutter speed (t11). Since the exposure timing on the focus position changes according to this change in shutter speed, the lens synchronizing signal is set so that the timing of the wobbling oscillation end matches the exposure timing on the focus position. Note that in an example of FIGS. 4A-4D, the wobbling operation cannot be performed at next exposure timing according to the change in shutter speed, although it depends on the responding performance on the lens side.

When the next exposure timing comes after the wobbling instruction command of timing t11 is transmitted to the interchangeable lens 200, the camera controller 140 transmits a request signal to the lens controller 240 (t12). When receiving the request signal, the lens controller 240 transmits, to the camera body 100, the information about the wobbling direction and the information about availability of the wobbling operation (t13). Since the wobbling operation cannot be performed at the next exposure timing in response to the wobbling instruction of the timing t11, the flag information "0" is transmitted as the information about availability of the wobbling operation at timing t13. Since the wobbling direction is not fixed at this time, the information about the wobbling direction is set to "0" as temporary information and is transmitted. At this time, the camera controller 140 calculates the AF evaluation value, but does not relate the AF evaluation value to the information about the wobbling direction.

The wobbling operation according to the wobbling instruction command of the timing t11 is not performed until next exposure timing. The camera controller 140 again transmits the request signal to the lens controller 240 (t14). When receiving the request signal, the lens controller 240 transmits, to the camera body 100, the information about the wobbling direction and the information about availability of the wobbling operation (t15). At this time point, since the wobbling operation can be performed at next exposure timing in response to the wobbling instruction of the timing t11, the flag information "1" is transmitted as the information about availability of the wobbling operation at the timing t15. Further, since the next wobbling direction is a direction toward the far side at the timing t15, the flag information "0" is transmitted. Similarly to the above, the camera controller 140 relates the calculated AF evaluation value to the flag information indicating the wobbling direction.

As described above, the AF evaluation value calculated near the wobbling oscillation end is reliably related to the information indicating whether the calculation is performed on the far side oscillation end or the near side oscillation end. For this reason, the two AF evaluation values on the far side and the near side are compared, so that the camera controller 140 can accurately determine the direction to which the focus lens 230 is moved at a subsequent cycle. Further, the lens controller 240 transmits the information indicating whether or not the wobbling operation can be performed at next exposure timing according to the wobbling instruction command from the camera controller 140. For this reason, the camera controller 140 does not falsely recognize that the focus lens 230 performs the wobbling operation even though the wobbling operation is not performed at the next exposure timing. By repeating such control, the camera system 1 accurately performs the autofocus control according to the wobbling.

The above describes the example of the wobbling control in the case where the shutter speed is changed. The exposure timing on the focus position changes not only according to the change in shutter speed but also according to a change in a position of an AF frame which is a frame indicating an area where the focus is adjusted in an image, and a change in a face detecting position. This is because the focus position in an image changes according to the change in AF frame position and the change in face detecting position. In this case as well, the lens synchronizing signal is generated so that the timing of the wobbling oscillation end matches with the exposure timing on the focus position. FIGS. 5A-5D are timing charts for describing the transmission/reception of the signals between the camera controller 140 and the lens controller 240 at the time of the wobbling control when the AF frame position changes to the vertical direction of an image. An operation shown in FIGS. 5A-5D is similar to the operation of the wobbling control at the time of changing the shutter speed described with reference to FIGS. 4A-4D.

4. Conclusion

As described above, the interchangeable lens 200 according to the present embodiment has a configuration including the focus lens 230 that changes the focus state of a subject, the focus motor 233 that drives the focus lens 230 while wobbling the focus lens 230 along the optical axis, the lens mount 250 and the lens controller 240 that obtain the control signals for driving the focus motor 233, and a configuration including the lens mount 250 and the lens controller 240 that notify the information about the wobbling of the focus lens 230 after obtaining the control signals. With this configuration, the interchangeable lens 200 can transmit the information about the wobbling of the focus lens 230 to the camera body 100.

Further, the interchangeable lens 200 can be mounted to the camera body 100 according to the present embodiment. The camera body 100 has the configuration including the body mount 150 and the camera controller 140 that obtain the information about the wobbling of the focus lens 230, and has the configuration including the camera controller 140 that generates control signals according to the obtained information about the wobbling of the focus lens 230, and the camera controller 140 and the body mount that transmit the control signals. With this configuration, the camera controller 140 can generate the control signals according to the obtained information about the wobbling of the focus lens 230.

The camera body 100 according to the present embodiment further has the CMOS image sensor 110 that captures a subject image to generate image data, and the camera controller 140 that calculates the AF evaluation values on the position of the focus lens 230 from the image data. The configuration including the camera controller 140 and the body mount obtains the information about the advancing and retreating directions of the wobbling as the information about the wobbling of the focus lens 230. The camera controller 140 relates the evaluation values obtained near the respective terminals of the wobbling advancing and retreating directions, to the information about the advancing and retreating directions of the wobbling corresponding to the evaluation values, and generates the control signals according to the related information. As a result, the camera controller 140 can reliably recognize whether the AF evaluation values calculated near both the wobbling oscillation ends are calculated on the far side or the near side. Therefore, the comparison between the two AF evaluation values enables the camera controller 140 to accurately determine whether the focus lens 230 should be moved to the far side or the near side at a subsequent cycle.

The camera body 100 according to the present embodiment further has the CMOS image sensor 110 that captures a subject image to generate image data. The configuration including the camera controller 140 and the body mount 150 obtains the information about availability of the wobbling operation based on a control signal at the timing of generating the image data just after the configuration including the lens controller 240 and the lens mount 250 obtains the control signal as the information about the wobbling of the focus lens 230. The camera controller 140 generates the control signal according to the information about availability of the wobbling operation. As a result, the camera controller 140 can be prevented from falsely recognizing that the focus lens 230 performs wobbling operation even though the focus lens 230 does not perform the wobbling operation at next exposure timing.

5. Other Embodiments

The above embodiment describes the example where the electronic shutter operation of the CMOS image sensor 110 is realized by the rolling shutter system, but the electronic shutter operation may be realized by a global shutter system.

In the above example, the imaging device is constituted by the CMOS image sensor 110, but the imaging device may be constituted by an NMOS image sensor or a CCD image sensor. The electronic shutter operation of the CCD image sensor adopts the global shutter system.

In the above example, in response to one wobbling instruction command from the camera controller 140 to the lens controller 240, the wobbling operation for one cycle including the movement of the focus lens 230 toward the far side and toward the near side (T1 and T'1, T6 and T'6, T11 and T'11, . . . ) is performed. For example, as shown in FIG. 4B, in response to one wobbling instruction command, the focus lens 230 is moved toward the far side (T1, T6, T11, . . . ), and then to the near side (T'1, T'6, T'11, . . . ). However, the method of the wobbling operation is not limited thereto. That is, one wobbling instruction command may instruct only the wobbling operation to any one of the far side and the near side. In this case, in order to perform the wobbling operation for one cycle, the camera controller 140 should transmit two wobbling instruction commands.

In the above example, in response to the wobbling instruction command from the camera controller 140 to the lens controller 240, the focus lens 230 is first moved to the far side so that the wobbling operation is started. However, the idea of the present embodiment is not limited thereto. That is, in response to the wobbling instruction command from the camera controller 140 to the lens controller 240, the focus lens 230 may be moved first to the near side. Also in this case, the direction of the wobbling operation can be related to the AF evaluation value calculated from the image data according to the wobbling operation. Accordingly, the camera controller 140 can accurately control the wobbling operation.

In the above example, the case where the exposure time is 1/60 sec or 1/120 sec has been described, but the exposure time is not limited thereto. As shown in FIGS. 6A-6D, the exposure may take long seconds that exceed an interval to of the exposure synchronizing signal (an example of FIGS. 6A-6D indicate a case in which the lens synchronizing signal corresponding to the exposure synchronizing signal is 30 Hz). In this case, when the camera controller 140 transmits a request signal to the lens controller 240 at the timings of the respective exposure synchronizing signals, the lens controller 240 sends back the same information about the wobbling direction to the camera controller 140. At this time, the camera controller 140 recognizes how many times the same information about the wobbling direction is continuously sent back from the lens controller 240 according to the setting of the long-second exposure. The plural pieces of the same information about the wobbling direction sent back continuously from the lens controller 240 as one piece of information are related to the calculated AF evaluation values. As a result, the camera system 1 can accurately control the wobbling operation even though the exposure takes long seconds that exceed the interval of the exposure synchronizing signal.

INDUSTRIAL APPLICABILITY

The present invention can be applied to an interchangeable lens, a camera body and a camera system of a digital still camera, a digital video camera, and the like.

What is claimed is:

1. An interchangeable lens mountable to a camera body, comprising:
   a focus lens operable to adjust a focus state of a subject;
   a driver operable to drive the focus lens according to a wobbling operation by periodically performing slight advancing and retreating of the focus lens along an optical axis;
   a lens-side obtaining unit operable to obtain a control signal for driving the driver from the camera body; and
   a lens-side transmission unit operable to transmit, to the camera body, information indicating a wobbling direction of the slight advancing and retreating of the focus lens at a next exposure timing according to the control signal.

2. A camera body to which the interchangeable lens according to claim 1 is mountable, comprising:
   a camera-side obtaining unit operable to obtain the information indicating the wobbling direction from the interchangeable lens;
   a controller operable to generate the control signal according to the information indicating the wobbling direction obtained by the camera-side obtaining unit; and
   a camera-side transmission unit operable to transmit the control signal to the interchangeable lens.

3. The camera body according to claim 2, further comprising:
   an imaging unit operable to capture a subject image to generate image data; and
   an evaluation unit operable to obtain an evaluation value of a focus state of the focus lens from the generated image data,
   wherein the controller associates evaluation values obtained near end points of both directions of the slight advancing and retreating of the focus lens with the information indicating the wobbling direction corresponding to each evaluation value, and generates the control signal based on the associated evaluation values and information indicating the wobbling direction.

4. An interchangeable lens mountable to a camera body, comprising:
   a focus lens operable to adjust a focus state of a subject;
   a driver operable to drive the focus lens according to a wobbling operation by periodically performing slight advancing and retreating of the focus lens along an optical axis;
   a lens-side obtaining unit operable to periodically obtain a control signal for driving the driver to perform the slight advancing and retreating of the focus lens, from the camera body, the periodically obtaining of the control signal occurring at predetermined timings; and
   a lens-side transmission unit operable to periodically transmit, to the camera body, information indicating availability of the wobbling operation for indicating whether or not the focus lens can be driven at a next exposure timing according to the periodically obtained control signal.

5. A camera body to which the interchangeable lens according to claim 4 is mountable, comprising:
   a camera-side obtaining unit operable to periodically obtain the information indicating availability of the wobbling operation from the interchangeable lens;
   a controller operable to generate the control signal according to the information indicating availability of the wobbling operation obtained by the camera-side obtaining unit; and
   a camera-side transmission unit operable to transmit the control signal to the interchangeable lens.

6. The camera body according to claim 5, further comprising:
   an imaging unit operable to capture a subject image to generate image data; and
   an evaluation unit operable to obtain an evaluation value of a focus state of the focus lens from the generated image data,
   wherein the controller associates evaluation values obtained near end points of both directions of the slight advancing and retreating of the focus lens with the information indicating availability of the wobbling operation corresponding to each evaluation value, and generates the control signal based on the associated evaluation values and information indicating availability of the wobbling operation.

7. An interchangeable lens mountable to a camera body, comprising:
   a focus lens operable to adjust a focus state of a subject;
   a driver operable to drive the focus lens according to a wobbling operation by periodically performing slight advancing and retreating of the focus lens along an optical axis;
   a lens-side obtaining unit operable to obtain a control signal for driving the driver to periodically perform the slight advancing and retreating of the focus lens, from the camera body; and
   a lens-side transmission unit operable to transmit, to the camera body, information indicating a wobbling direction of the slight advancing and retreating of the focus lens at a next exposure timing according to the control signal, and information indicating availability of the wobbling operation for indicating whether or not the focus lens can be driven at the next exposure timing according to the control signal.

8. A camera body to which the interchangeable lens according to claim 7 is mountable, comprising:
   a camera-side obtaining unit operable to obtain the information indicating the wobbling direction and the information indicating availability of the wobbling operation from the interchangeable lens;
   a controller operable to generate the control signal according to the information indicating the wobbling direction and information indicating availability of the wobbling operation obtained from the camera-side obtaining unit; and
   a camera-side transmission unit operable to transmit the control signal to the interchangeable lens.

9. The camera body according to claim 8, further comprising:

an imaging unit operable to capture a subject image to generate image data; and an evaluation unit operable to obtain an evaluation value of a focus state of the focus lens from the generated image data, wherein when the information indicating availability of the wobbling operation indicates that the focus lens can be driven, the controller associates evaluation values obtained near end points of both directions of slightly advancing and retreating of the focus lens with the information indicating the wobbling direction of the slight advancing and retreating of the focus lens corresponding to each evaluation value and generates the control signal based on the associated evaluation values and the information indicating the wobbling direction, and when the information indicating availability of the wobbling operation indicates that the focus lens cannot be driven, the controller does not associate each of the evaluation values obtained near end points of both directions of the slight advancing and retreating of the focus lens with the information indicating the wobbling direction of the slight advancing and retreating of the focus lens corresponding to the evaluation values and generates the control signal.

10. A camera system comprising an interchangeable lens and a camera body to which the interchangeable lens is mountable, wherein the interchangeable lens includes:
a focus lens operable to adjust a focus state of a subject;
a driver operable to drive the focus lens according to a wobbling operation by periodically performing slight advancing and retreating of the focus lens along an optical axis;
a lens-side obtaining unit operable to obtain a control signal for driving the driver to periodically perform the slight advancing and retreating of the focus lens, from the camera body; and
a lens-side transmission unit operable to transmit, to the camera body, information indicating a wobbling direction of the slight advancing and retreating of the focus lens at a next exposure timing according to the control signal, the camera body includes:
a camera-side obtaining unit operable to obtain the information indicating the wobbling direction from the interchangeable lens;
a controller operable to generate the control signal according to the information indicating the wobbling direction obtained from the camera-side obtaining unit; and
a camera-side transmission unit operable to transmit the control signal to the interchangeable lens.

11. A camera system comprising an interchangeable lens, and a camera body to which the interchangeable lens is mountable, wherein the interchangeable lens includes:
a focus lens operable to adjust a focus state of a subject;
a driver operable to drive the focus lens according to a wobbling operation by periodically performing the slight advancing and retreating of the focus lens along an optical axis;
a lens-side obtaining unit operable to periodically obtain a control signal for driving the driver to perform the slight advancing and retreating of the focus lens, from the camera body, the periodically obtaining of the control signal occurring at predetermined timings; and
a lens-side transmission unit operable to periodically transmit, to the camera body, information indicating availability of the wobbling operation for indicating whether or not the focus lens can be driven at a next exposure timing according to the periodically obtained control signal, the camera body includes:
a camera-side obtaining unit operable to periodically obtain the information indicating availability of the wobbling operation from the interchangeable lens;
a controller operable to generate the control signal according to the information indicating availability of the wobbling operation obtained from the camera-side obtaining unit; and
a camera-side transmission unit operable to transmit the control signal to the interchangeable lens.

12. A camera system comprising an interchangeable lens, and a camera body to which the interchangeable lens is mountable, wherein the interchangeable lens includes:
a focus lens operable to adjust a focus state of a subject;
a driver operable to drive the focus lens according to a wobbling operation by periodically performing slight advancing and retreating of the focus lens along an optical axis;
a lens-side obtaining unit operable to obtain a control signal for driving the driver to periodically perform the slight advancing and retreating of the focus lens, from the camera body; and
a lens-side transmission unit operable to transmit, to the camera body, information indicating a wobbling direction of the slight and periodic advancing and retreating of the focus lens at a next exposure timing according to the control signal, and information indicating availability of the wobbling operation for indicating whether or not the focus lens can be driven at the next exposure timing according to the control signal, the camera body includes:
a camera-side obtaining unit operable to obtain the information indicating the wobbling direction and the information indicating availability of the wobbling operation from the interchangeable lens;
a controller operable to generate the control signal according to the information indicating the wobbling direction and the information indicating availability of the wobbling operation obtained from the camera-side obtaining unit; and
a camera-side transmission unit operable to transmit the control signal to the interchangeable lens.

* * * * *